(12) United States Patent
Hanna et al.

(10) Patent No.: US 11,548,474 B2
(45) Date of Patent: Jan. 10, 2023

(54) METHOD FOR OPENING A VEHICLE

(71) Applicant: DAIMLER AG, Stuttgart (DE)

(72) Inventors: Yousif Hanna, Ostelsheim (DE); Verena Lutterbeck, Gärtringen (DE); Matthias Reinhardt, Sindelfingen (DE); Christian Rupert, Herrenberg (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 165 days.

(21) Appl. No.: 17/286,080

(22) PCT Filed: Oct. 11, 2019

(86) PCT No.: PCT/EP2019/077633
§ 371 (c)(1),
(2) Date: Apr. 16, 2021

(87) PCT Pub. No.: WO2020/078855
PCT Pub. Date: Apr. 23, 2020

(65) Prior Publication Data
US 2021/0354661 A1 Nov. 18, 2021

(30) Foreign Application Priority Data
Oct. 17, 2018 (DE) ............... 10 2018 008 227.0

(51) Int. Cl.
*G07C 9/00* (2020.01)
*B60R 25/24* (2013.01)

(52) U.S. Cl.
CPC ........ *B60R 25/241* (2013.01); *G07C 9/00309* (2013.01); *G07C 9/00571* (2013.01); *G07C 2209/08* (2013.01)

(58) Field of Classification Search
None
See application file for complete search history.

(56) References Cited

U.S. PATENT DOCUMENTS

| | | | |
|---|---|---|---|
| 5,266,925 A | 11/1993 | Vercellotti et al. | |
| 6,337,619 B1 | 1/2002 | Kowalski et al. | |
| 6,445,283 B1 | 9/2002 | Pang et al. | |

(Continued)

FOREIGN PATENT DOCUMENTS

| | | |
|---|---|---|
| CN | 1224519 A | 7/1999 |
| CN | 106067197 A | 11/2016 |

(Continued)

OTHER PUBLICATIONS

International Search Report dated Jan. 24, 2020 in related/corresponding International Application No. PCT/EP2019/077633.

(Continued)

*Primary Examiner* — K. Wong
(74) *Attorney, Agent, or Firm* — Patent Portfolio Builders PLLC

(57) ABSTRACT

A plurality of keys are registered to the vehicle for opening the vehicle. A respective key must answer within a predetermined timeslot after a first request transmitted by the vehicle, in order to open the vehicle. Several such successive timeslots are provided and several keys are allocated to at least one of these timeslots.

10 Claims, 3 Drawing Sheets

(56) References Cited

U.S. PATENT DOCUMENTS

Figure 1:
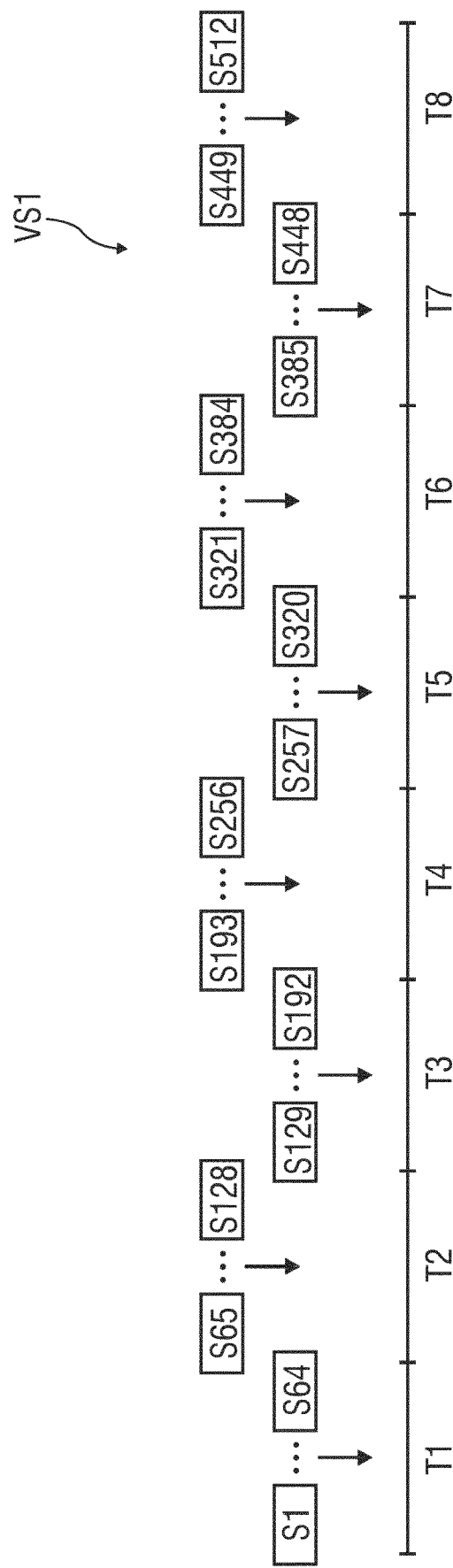

| | | | |
|---|---|---|---|
| 7,328,044 B2 | 2/2008 | Sugimoto et al. | |
| 10,589,718 B2 * | 3/2020 | Gennermann | G07C 9/00309 |
| 2013/0214900 A1 | 8/2013 | Mitchell | |
| 2014/0303811 A1 | 10/2014 | Ledendecker | |
| 2015/0235494 A1 | 8/2015 | Creguer et al. | |

FOREIGN PATENT DOCUMENTS

| | | |
|---|---|---|
| CN | 108540160 A | 9/2018 |
| DE | 19743101 A1 | 5/1998 |
| DE | 19652227 A1 | 6/1998 |
| DE | 19941350 A1 | 10/2000 |
| DE | 10112573 A1 | 10/2002 |
| DE | 10202282 A1 | 7/2003 |
| DE | 102005020619 A1 | 6/2006 |
| DE | 102016215924 A1 | 3/2018 |
| EP | 1239401 A1 | 9/2002 |
| WO | 2015176826 A1 | 11/2015 |

OTHER PUBLICATIONS

Office Action created on Jun. 11, 2019 in related/corresponding DE Application No. 10 2018 008 227.0.
Written Opinion dated Jan. 24, 2020 in related/corresponding International Application No. PCT/EP2019/077633.
Office Action dated Aug. 31, 2022 in related/corresponding CN Application No. 201980068464.7.

* cited by examiner

METHOD FOR OPENING A VEHICLE

BACKGROUND AND SUMMARY OF THE INVENTION

Exemplary embodiments of the invention relate to a method for opening a vehicle.

A system and method for opening a vehicle using an opening code valid once and/or valid for a first period of time are known from the prior art, as described in DE 10 2016 215 924 A1. On the vehicle side, the system comprises a first code generator that generates the opening code according to a specific generating instruction and is synchronized with a second code generator external to the vehicle that respectively generates a corresponding opening code. On vehicle side, the system moreover comprises a receiver for receiving a signal from a signal source external to the vehicle that conveys a signal modulated with a code generated by the second code generator external to the vehicle, a demodulator for demodulating a signal received by the receiver, an evaluation device for checking whether the code conveyed in the signal satisfies an opening condition, and an opening device for opening the vehicle when the opening condition is satisfied. A system external to the vehicle comprises at least one corresponding second code generator, a database, which keeps an allocation between the opening code and a corresponding vehicle current, one or more communication interfaces for receiving requests according to an opening code for vehicles and for sending corresponding opening codes when a request is permitted, and a module for checking requests for permissibility according to an opening code.

WO 2015/176826 A1 discloses a system and a method for access control in which, when a user accesses a physical device by using a mobile access device, an identity check of the user is carried out, wherein the user is identified in relation to the mobile access device. After successfully checking the identity, a wireless communication connection between the mobile access device and the access control unit of the physical device is established, and identity information and unique access data are transmitted by the mobile access device to the access control unit. The access control unit determines the access rights to the physical device by means of the information received and by means of further information from the central control platform.

DE 101 12 573 A1 discloses a method for initiating a theft protection system for a vehicle in which a theft protection system is initially brought into an initiation state. A request signal is then emitted. In each code transducer receiving a request signal, a transmission time characteristic of the respective code transducer is generated by means of a random principle. Then, an answer signal is emitted within this transmission time. Then, all answer signals received are evaluated in the motor vehicle. The code transducers are clearly recognized by the different transmission times, and the initiation can be carried out directly with clients using universal code transducers.

A mobile device registration system is described in DE 10 2005 020 619 A1, the system comprising a smart unit, which is mounted in a vehicle, having a unique smart ID corresponding to the vehicle and allowing a registration of a mobile device ID, and a mobile device, which has a unique mobile device ID and allows a registration of the smart ID. When the smart unit registers the mobile device ID of a mobile device in the system, the smart unit registers its own smart ID in the mobile device. The unlocking or locking of the vehicle is only carried out when the smart unit detects the mobile device with the mobile device ID registered in the smart unit.

DE 197 43 101 A1 discloses a method for allocating an actuation element to an instrument in which a search signal is emitted from a transmission device arranged in the instrument. When the search signal is in agreement with a reference signal set in advance, a contact signal is emitted by a processing device arranged in the actuation element, the processing device containing means for receiving search signals, wherein the contact signal is emitted by the processing device at the end of a predetermined waiting time starting from the input of the search signal. A waiting time characterizing this actuation element is assigned by the instrument in connection with an actuation element not yet allocated, in order to train it. Training the actuation elements not yet allocated is only permitted when a certain actuation element already allocated is in the active region of the search signal.

DE 196 52 227 A1 discloses a method and a device for allocating a remote operation to a base station, the method comprising the steps of emitting a search signal by the base station, receiving the search signal, comparing it with a reference signal and emitting a presence signal by the actuation element when the search signal is in accordance with the reference signal. If no presence signal responds to a search signal, the emission of a search signal is repeated by the base station at the end of a repetition time. Carrying out the method takes place by means of a base station, which has means for detecting the time that has elapsed from the start of an emission of a search signal, and by means of remote operation which switches from a base state into an active state upon the input of a search signal.

A device and a method for releasing a security device, in particular an access device for a motor vehicle, is known from DE 199 41 350 A1. After obtaining a stimulus sequence start signal emitted by a transmitter of a transmission device, a piece of encoded information (release signal) is emitted by a portable transmission unit (radio key) and received by a receiver of the transmission device. A control instrument compares the received release signal with a predetermined piece of encoded information and, when these match, emits a control signal to the security device. In the presence of several appropriate radio keys in the detection region of the device, the transmission quality between the security device and radio keys is checked. Only the radio key that has the most favorable transmission conditions in relation to the security device is used to emit a release signal.

US 2013/0 214 900 A1 discloses a passive access system comprising an unlocking module, which implements a key operation in a keyless environment, and several key fobs, which are configured to trigger the unlocking module to carry out the key operation. A unique value is allocated to each key fob. The unblocking module determines a range of identification values, generates an authentication request packet based on the range of identification of values and emits the request packet. Each key fob receives the request packet and determines whether the unique identification value of the corresponding key fob falls into the range of identification values. The key fob also generates an answer packet when the unique identification value falls in the range of the identification values, and sends the answer packet to the unlocking module. The unlocking module receives the answer packets from the key fobs and carries out the cooperation based on one of the answer packets received.

Exemplary embodiments of the invention are directed to a method for opening a vehicle that is improved in comparison to the prior art.

In a method for opening a vehicle, a plurality of keys for opening the vehicle are registered to the vehicle, wherein the respective key must answer within a predetermined timeslot after a first request sent by the vehicle, in order to open the vehicle, and wherein several such successive timeslots are provided. According to the invention, several keys are allocated to at least one of these timeslots, advantageously several or all timeslots. Here, each key is only allocated to one timeslot.

The keys are respectively also referred to, for example, as keylines, ID transponders or identification transponders. The timeslots are respectively also referred to as Timeslots. The respective timeslot is a predetermined period of time. Expediently, all timeslots are the same length. The timeslots follow sequentially one after the other after a respective request sent by the vehicle, i.e., the vehicle waits for an answer from a respective key registered to the vehicle during the sequential duration of these timeslots.

The method according to the invention is provided for an access system of the vehicle, in particular for a so-called keyless access system, in which the vehicle is not mechanically opened by means of a conventional key, but rather by transmitting a correct code as an answer to a respective request of the vehicle. Here, an access to the vehicle, in particular opening the vehicle, is carried out, wherein unlocking at least one opening mechanism and/or a complete opening of at least one closure element, for example a flap or a door of the vehicle, can be understood as opening, by a request, in this method initially a first request, being transmitted by the vehicle to keys present in the surroundings of the vehicle, in particular to keys registered to the vehicle which are thus authorized to open the vehicle. If a respective key receives this request, i.e., if it is close enough to the vehicle in order to receive this request, then it answers this in order to thus open the vehicle.

In this method, the vehicle is thus not mechanically opened by means of the respective key, as already mentioned above, but rather by a bidirectional data communication between the vehicle and the respective key. The respective request of the vehicle is here, in particular, a so-called broadcast message, i.e., sending a round data message or round radio data message to all keys possibly in the vicinity of the vehicle and registered to the vehicle. The answer of the respective key is a data message to the vehicle. This communication between the vehicle and the respective key is carried out wirelessly, i.e., in particular via a radio communication. In order to avoid an exchange with conventional keys and a conventional mechanical opening of the vehicle by introducing the key into a door lock on the vehicle and moving it in the door lock, the term ID transponder or identification transponder is thus also used for the keys used in this method, as already mentioned above.

By means of the method according to the invention, a higher number of keys can be registered to the vehicle, in particular the number of registered keys can exceed a number of timeslots. For example, eight successive timeslots are provided in which the keys must answer correspondingly to the allocation to the respective timeslot. If only one key were to be allocated to each of these timeslots, then only eight keys could correspondingly be registered to the vehicle. In some applications scenarios, however, eight keys per vehicle is not sufficient. For example, for car sharing uses with a plurality of users for the respective vehicles, it is advantageous when more, in particular substantially more, than eight keys can be registered to the vehicle. An alternative possibility would be, for example, increasing the number of timeslots. However, this would considerably lengthen a time until opening the vehicle, since a key registered in the final timeslot would have to wait longer until it may answer the respective request of the vehicle, and could only then open the vehicle by means of its answer.

The method according to the invention avoids this by the number of timeslots being maintained or a relatively small number of timeslots, for example eight timeslots, being predetermined, yet not only one key being allocated to each timeslot, but rather several keys being allocated to at least one timeslot, advantageously several or all timeslots, wherein furthermore each key is naturally only allocated to one of the timeslots.

When only one key answers the first request of the vehicle in at least one of the timeslots, the vehicle is opened with this key. In such a case, obviously only one key is in the sufficient reception range in relation to the vehicle for receiving the first request of the vehicle and in the sufficient transmission range to the vehicle, in order to send its answer to the vehicle. The vehicle is then opened with this key.

When, in each case, only one key answers the first request of the vehicle in several timeslots, the vehicle is opened with this one key, for example with the key with the lowest value. The keys are numbered successively or lined up in a different manner, such that the key with the lowest value, which answers as the only key in its timeslot, can be selected. Thus, with several keys in the reception range for receiving the first request of the vehicle and in the transmission range for sending the answer to the vehicle, the keys respectively answering as the only key of their timeslot, a problem-free opening of the vehicle is also ensured. Instead of the key with the lowest value, a different specification, for example, can be provided, for example the key with the highest value answering as the only one of its time slot can be used. In other words, there is always a unique specification as to which key is used in such a case for opening.

When only one key does not answer the first request in any of the timeslots, but rather several keys answer the first request of the vehicle in at least one of the timeslots, a redistribution of the keys is undertaken by a second request being sent by the vehicle in which only the keys allocated to this timeslot are distributed, in particular evenly, across all timeslots and must answer the second request of the vehicle within the timeslot respectively allocated to them in order to open the vehicle. The keys of the other timeslots are no longer taken into consideration, i.e., no longer addressed by the second request of the vehicle. When several keys answer in a timeslot, a collision is present in this timeslot, since there is no provision to open the vehicle with a key when a further key still answers in the timeslot of this key. In order to trigger this collision, the keys of this timeslot, i.e., all keys initially allocated to this collision timeslot, are distributed across all timeslots, advantageously evenly distributed. Thus, fewer keys are now allocated to each timeslot, whereby the probability of a further collision decreases.

When only one key does not answer the first request of the vehicle in any of the timeslots, but rather in each case several keys answer the first request of the vehicle in several of the timeslots, a redistribution of the keys is undertaken by the second request being emitted by the vehicle in which only the key is allocated to one of these timeslots, for example the key allocated to the timeslot with the lowest value, is distributed, in particular evenly, across all timeslots and must answer the second request of the vehicle within the timeslot respectively allocated to it in order to open the vehicle. The keys of the other timeslots are no longer taken into consideration, i.e., no longer addressed by the second request of the vehicle. There is clear predetermination as to which of the timeslots affected by the collision is selected, i.e., as mentioned above, the lowest value or, for example, the highest value or a different time slot. As already described above in relation to the keys, the timeslots are also numbered sequentially, for example, or lined up in a different manner, such that the lowest value or the highest value timeslot in which the collision occurs can be correspondingly selected, for example.

When only one key answers the second request of the vehicle in at least one of the timeslots, the vehicle is opened using this key. This corresponds to the procedure described above after the first request and the answer of only one key.

When, in each case, only one key answers the second request of the vehicle in several timeslots, the vehicle is opened using one of these keys, for example with the key with the lowest value. This corresponds to the procedure described above after the first request and the answer of several keys in various timeslots. Alternatively, a different key selection can also be predetermined here, for example the key with the highest value. The specification as to which key is to be used advantageously corresponds to the specification above for the first request of the vehicle.

When only one key answer does not answer the second request of the vehicle in any of the timeslots, but rather several keys answer the second request of the vehicle in at least one of the timeslots, i.e., when a collision occurs again despite the now lower probability of a collision, a redistribution of the keys is undertaken again by a third request being sent by the vehicle in which only the keys allocated to this timeslot are distributed, in particular evenly, across all timeslots and must answer the third request of the vehicle within the timeslot respectively allocated to them in order to open the vehicle. The keys of the other timeslots are no longer taken into consideration, i.e., no longer addressed by the third request of the vehicle. Thus, in order to trigger this renewed collision, the keys of this timeslot, i.e., all keys initially allocated to this timeslot, are thus distributed across all timeslots, advantageously evenly distributed. Thus, fewer keys are again now allocated to each timeslot, whereby the probability of a further collision sinks further. Depending on the number of keys allocated at the start to each timeslot and the number of timeslots, still only one key is now allocated, for example, to each timeslot, such that the collision probability is zero, and thus the vehicle is opened no later by the answer to this third request.

When only one key does not answer the second request of the vehicle in any of the timeslots, but rather in each case several keys answer the second request of the vehicle in several of the timeslots, a redistribution of the keys is undertaken by the third request being sent by the vehicle in which only the one key allocated to one of these timeslots, in particular the keys allocated to the timeslot with the lowest value, are distributed, in particular evenly, to all timeslots and must answer the third request of the vehicle within the timeslot respectively allocated to them in order to open the vehicle. The keys of the other timeslots are no longer taken into consideration, i.e., no longer addressed by the third request of the vehicle. There is clear predetermination as to which of the timeslots affected by the collision is selected, i.e., as mentioned above, the lowest value or, for example, the highest value or a different time slot. The specification advantageously corresponds to the specification above for the first request of the vehicle.

The redistribution of the keys by further requests of the vehicle, which the respective keys then allocated to the respective timeslot must answer within the timeslot respectively allocated to them, is advantageously repeated until only one key answers the respective request of the vehicle in at least one of the timeslots. This is at the latest the case when only one key is still allocated to each timeslot, since then no more collisions can occur in a respective timeslot. As described above, this can occur, for example, already after the third request of the vehicle, depending on how many timeslots are provided and how many keys are allocated to the respective timeslot at the start.

For example, the vehicle is opened at the latest by an answer of a key to the third request of the vehicle, since only one key is still allocated to each timeslot at the latest after the third request because of the number of timeslots and the number of keys allocated to each time slot. Thus, it is ensured that a maximum necessary time until opening the vehicle remains sufficiently small in order to avoid negatively affecting comfort, for example, as a result of long waiting times until opening the vehicle. Nevertheless, with this procedure, a very high number of keys can also be used for the vehicle. Thus, with eight timeslots and only a maximum of three provided requests of the vehicle until opening, 512 keys can be registered to the vehicle. At the start, i.e., for the first request of the vehicle, this would be 64 keys per timeslot. In the event of a collision, the 64 keys of the collision timeslot would be distributed across all eight timeslots by the second request of the vehicle, i.e., 8 keys per timeslot. In the event of another collision, the eight keys of the collision timeslots have been distributed across all eight timeslots by the third request of the vehicle, i.e., one key per timeslot. A collision can now no longer occur, such that the vehicle is opened with the answer of one of the keys, for example corresponding to the specification with the lowest value or for example the highest value key which answers the third request in its timeslot.

Thus, in comparison to only one key per timeslot, with eight timeslots, 504 additional keys can be trained to the vehicle, i.e., registered, by means of the method. Thus, for example with private car sharing, more than eight users can constantly share the vehicle. With commercial car sharing and personalized keys, substantially more users can also be registered to a respective vehicle, i.e., their keys trained to the vehicle, i.e., registered.

After the vehicle has been opened in the manner described, the initial distribution of keys across the timeslots, i.e., their initial allocation to the timeslots, is advantageously reproduced, such that all keys registered to the vehicle can be used again for a subsequent opening process, and the method can be carried out again in the described manner.

Exemplary embodiment of the invention are described below in more detail by means of the drawings.

BRIEF DESCRIPTION OF THE DRAWING FIGURES

Figure 2:
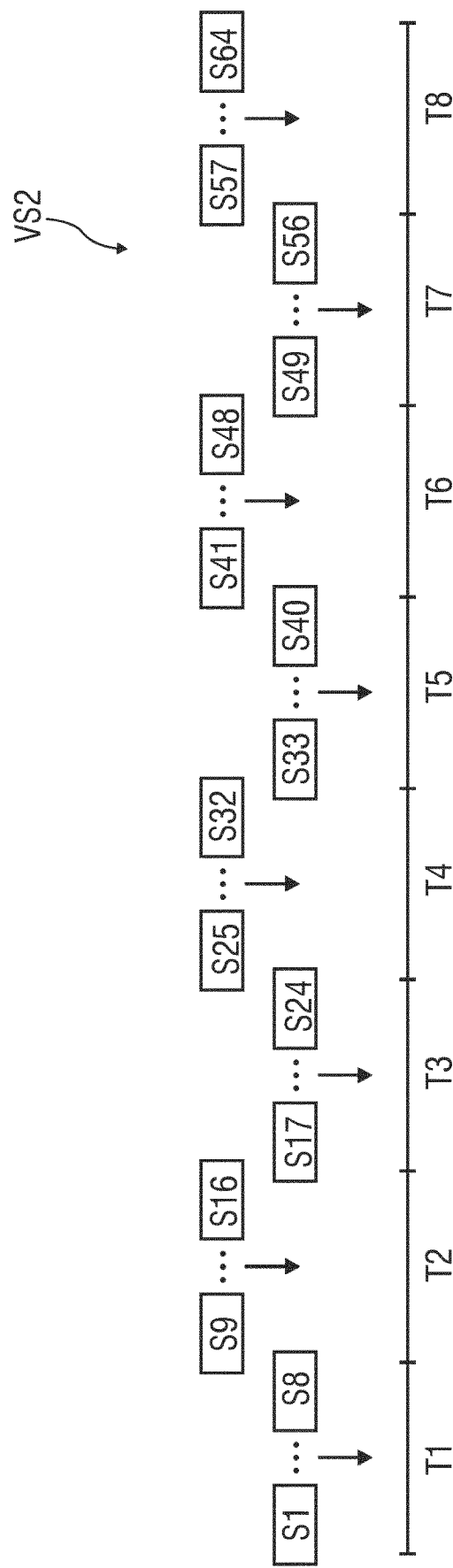
Figure 3:
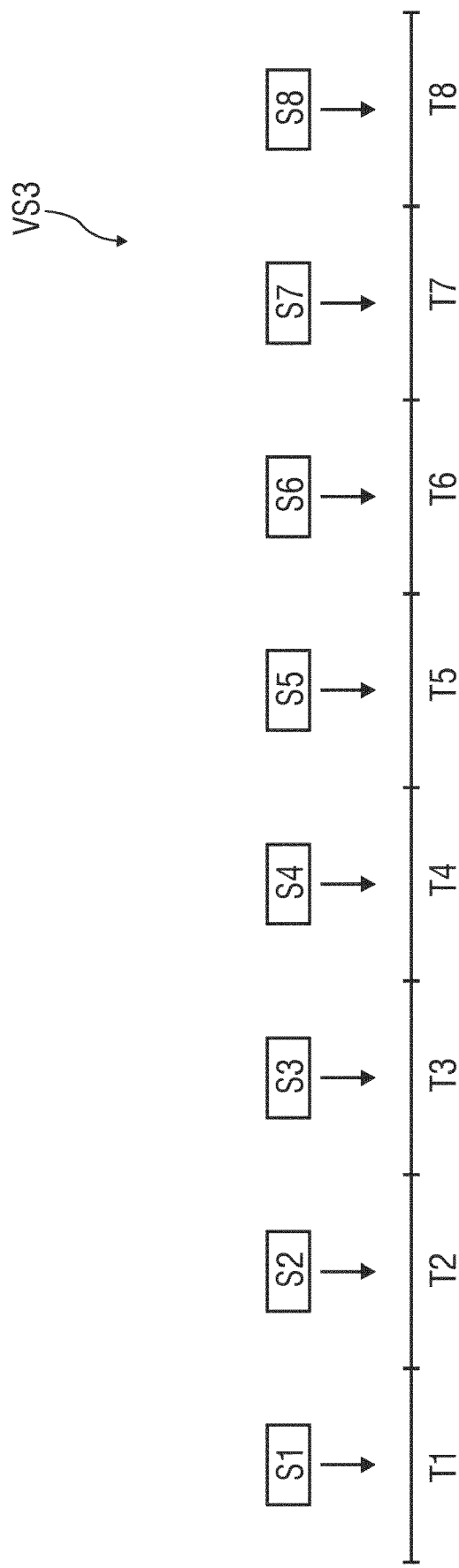

Here are shown:

FIG. 1, schematically, a first method step of a method for opening a vehicle, FIG. 2, schematically, a second method step of a method for opening a vehicle, and FIG. 3, schematically, a third method step of a method for opening a vehicle.

DETAILED DESCRIPTION

FIGS. 1 to 3 schematically show exemplary method steps VS1, VS2, VS3 of a method for opening a vehicle. The method is provided for an access system of the vehicle, in particular for a so-called keyless access system, in which the vehicle is not mechanically opened by means of a conventional key, but rather by transmitting a correct code using a key S1 to S512, also referred to as a key line, ID transponder or identification transponder, as an answer to a respective request of the vehicle.

Here, an access to the vehicle, in particular opening the vehicle, is carried out, wherein opening is to be understood at least as an unlocking of at least one opening mechanism by a request, in this method initially a first request, being transmitted to keys S1 to S512 present in the surroundings of the vehicle by the vehicle, in particular to keys S1 to S512 registered to the vehicle, which are thus authorized to open the vehicle. If a respective key S1 to S512 receives this request, i.e., if it is close enough to the vehicle in order to receive this request, then it answers this in order to thus open the vehicle.

Thus, in this method, the vehicle is not mechanically opened by means of the respective key S1 to S512, but rather by a bidirectional data communication between the vehicle and the respective key S1 to S512. The respective request of the vehicle is here, in particular, a so-called broadcast message, i.e., a transmission of a round data message or round radio data message to all keys S1 to S512 possibly in the vicinity of the vehicle and registered to the vehicle. The answer of the respective key S1 to S512 is a data message to the vehicle. This communication between the vehicle and the respective key S1 to S512 is carried out wirelessly, i.e., in particular via a radio communication.

In this method for opening the vehicle, a plurality of keys S1 to S512 are registered to the vehicle for opening the vehicle. The respective key S1 to S512 must answer within a predetermined timeslot T1 to T8, i.e., within a predetermined period of time, after a first request transmitted by the vehicle, in order to open the vehicle. Several such sequentially successive timeslots T1 to T8 are provided, in the example depicted here eight timeslots T1 to T8. Their expiry follows after the respect request of the vehicle.

The distribution of the keys S1 to S512 into various timeslots T1 to T8 would prevent a collision of several simultaneously answering keys S1 to S512, though only if only one key S1 to S512 were to be allocated to each timeslot T1 to T8. Thus, the number of keys S1 to S512 that can be registered to the vehicle would, however, be limited to the number of timeslots T1 to T8. Thus, in the example shown here with eight timeslots T1 to T8, only eight keys S1 to S512 could be registered to the vehicle. The provision of further timeslots T1 to T8 would lead to an unacceptable temporal lengthening until opening the vehicle.

For example, with private or commercial car sharing, a number of possible users would thus be limited to only eight users and thereby be greatly limited. For example, with keys S1 to S512 that can be transferred between various vehicles, in particular personalized keys S1 to S512, the number of keys S1 to S512 that can be simultaneously trained to a respective vehicle would also be correspondingly limited.

In order to solve this problem, in the method described here, it is provided that several keys S1 to S512 are allocated to at least one of these timeslots T1 to T8, advantageously to several or, as in the example depicted here, to all timeslots T1 to T8. That is to say, in each case, not only one key S1 to S512, but rather several keys S1 to S512, may be registered in each of the eight timeslots T1 to T8 here, i.e., may answer the vehicle. In the example depicted here, these are 64 keys per timeslot S1 to S512 and thus, with eight timeslots T1 to T8, in total 512 keys S1 to S512, as shown in FIG. 1.

If, in one timeslot T1 to T8, only one key S1 to S512 is registered to a respective request of the vehicle, a further opening process is carried out by this key S1 to S512, and the vehicle is thus opened by this key S1 to S512. If, in several timeslots T1 to T8, in each case only one key S1 to S512 is registered, then the further opening process is carried out by this key S1 to S512, for example with the keys S1 to S512 numbered successively in this example, the key with the lowest value, and thus the vehicle is opened with this key S1 to S512. This applies for each of the three possible requests of the vehicle in this method.

If, in none of the timeslots T1 to T8, only one key S1 to S512 is registered, but rather in one of the timeslots T1 to T8 more than one key S1 to S512 is registered, i.e., in this timeslot T1 to T8 it results in a collision of several keys S1 to S512 and thus a data collision of the data transmitted by these keys S1 to S512 because several keys S1 to S512 are present in the vicinity of the vehicle, i.e., are in close enough vicinity to the vehicle for the bidirectional communication, only the keys S1 to S512 from this collision timeslot, i.e., from the timeslot T1 to T8 in which the collision has occurred, are still taken into consideration in a repetition request of the vehicle, i.e. in a second request. These keys S1 to S512 are distributed to the timeslots T1 to T8. Thus, the number of keys S1 to S512 per timeslot T1 to T8 is reduced and thus the probability for a further data collision.

In the example depicted here with 512 keys S1 to S512 and eight timeslots T1 to T8, a maximum of three search processes is sufficient, i.e., three corresponding requests of the vehicle, in order to filter one key S1 to S512 out of the 512 keys S1 to S512 which opens the vehicle upon the third request of the vehicle, since at the latest after the second request, only eight keys S1 to S512 are still present in the collision timeslot which are distributed to the eight timeslots T1 to T8 by the third request of the vehicle, such that then only one key S1 to S512 per timeslot T1 to T8 is still present and thus collisions can no longer arise.

A possible course of the method with 512 keys registered to the vehicle and eight timeslots T1 to T8 is described below. 64 keys are allocated to each timeslot T1 to T8, as shown in FIG. 1, i.e., the keys S1 to S64 to the first timeslot T1, the keys S65 to S128 to the second timeslot T2, the keys S129 to S192 to the third timeslot T3, the keys S193 to S256 to the fourth timeslot T4, the keys S257 to S320 to the fifth timeslot T5, the keys S321 to S384 to the sixth timeslot T6, the keys S385 to S448 to the seventh timeslot T7, and the keys S449 to S512 to the eighth timeslot T8.

In the first method step VS1, the vehicle emits a first request as to whether keys S1 to S512 for opening the vehicle are in the vicinity.

If only one key S1 to S512 is registered in a timeslot T1 to T8 in response to this first request, the further opening process is carried out with this key S1 to S512, and the vehicle is thus opened with this key S1 to S512.

If, in each case, only one key S1 to S512 is registered in several timeslots T1 to T8 in response to this first request, then the further opening process is carried out by one of these keys S1 to S512, for example by the key S1 to S512 with the lowest value, and the vehicle is thus opened with this key S1 to S512.

However, in the example depicted here, if only one key S1 to S512 is registered in none of the timeslots T1 to T8, but rather a data collision occurs in one of the timeslots T1 to T8, in the example depicted here in the first timeslot T1, since several of the keys S1 to S64 allocated to this first timeslot T1 are registered here, i.e., answer in response to the first request of the vehicle, two or more of these keys S1 to S64, for example, are registered. If such data collisions were to occur in several timeslots T1 to T8, then the method would be continued by the keys S1 to S512 of one of these timeslots T1 to T8, for example by the timeslot T1 to T8 with the lowest value in which such a data collection occurs.

However, in the example depicted here, this data collision only occurs in the first timeslot T1, or the first timeslot T1 is the timeslot with the lowest value of these timeslots T1 to T8 in which the data collision occurs as a result of several keys S1 to S512 answering the first request of the vehicle.

Thus, in a second method step VS2 depicted in FIG. 2, a redistribution of the keys S1 to S512 allocated to the timeslots T1 to T8 is undertaken by a second request being transmitted by the vehicle, in which only the keys S1 to S64 allocated to this first timeslot T1 in the example depicted here, in which the data collision occurs, are distributed, in particular simultaneously, to all timeslots T1 to T8 and must answer the second request of the vehicle within the timeslot T1 to T8 respectively allocated to them, in order to open the vehicle. The other keys S65 to S512 are no longer taken into consideration and no longer addressed, correspondingly in particular also as a result of the second request of the vehicle.

Thus, only eight keys S1 to S64 are now still allocated to each timeslot T1 to T8, i.e., the keys S1 to S8 to the first timeslot T1, the keys S9 to S16 to the second timeslot T2, the keys S17 to S24 to the third timeslot T3, the keys S25 to S32 to the fourth timeslot T4, the keys S33 to S40 to the fifth timeslot T5, the keys S41 to S48 to the sixth timeslot T6, the keys S49 to S56 to the seventh timeslot T7, and the keys S57 to S64 to the eighth timeslot T8.

Thus, the collision probability is already considerably reduced.

If only one key S1 to S64 is registered in a timeslot T1 to T8 in response to this second request, the further opening process is carried out by this key S1 to S64, and the vehicle is thus opened by this key S1 to S64.

If, in each case, only one key S1 to S64 is registered in several timeslots T1 to T8 in response to this second request, then the further opening process is carried out by one of these keys S1 to S64, for example by the key S1 to S64 with the lowest value, and the vehicle is thus opened by this key S1 to S64.

However, in the example depicted here, only one key S1 to S64 is registered in none of the timeslots T1 to T8, but rather a data collision occurs again in one of the timeslots T1 to T8, in the examples depicted here in the first timeslot T1, since several of the keys S1 to S8 allocated to this first timeslot T1 are registered here, i.e., answer the second request of the vehicle, for example two or more of these keys S1 to S8. Were such data collisions to occur in several timeslots T1 to T8, then the method would be continued by the keys S1 to S64 of one of these timeslots T1 to T8, for example by the timeslot T1 to T8 with the lowest value in which such a data collision occurs.

However, in the example depicted here, this data collision only occurs in the first timeslot T1, or the first timeslot T1 is the timeslot T1 to T8 with the lowest value in which the data collision occurs as a response of several keys S1 to S64 answering the second request of the vehicle.

Thus, in a third method step VS3 depicted in FIG. 3, another redistribution of the keys S1 to S64 allocated to the timeslots T1 to T8 is undertaken by a third request being transmitted by the vehicle in which only the keys S1 to S8 allocated to this first timeslot T1 depicted in the example here in which the data collision occurs are distributed, in particular evenly, across all timeslots T1 to T8 and must answer the third request of the vehicle within the timeslot T1 to T8 allocated to them, in order to open the vehicle. The other keys S9 to S64 and, of course, the keys S65 to S512 already no longer taken into consideration in the second method step VS2, are no longer taken into consideration and no longer addressed correspondingly in particular by the third request of the vehicle as well.

Thus, only one key is still allocated now to each timeslot, i.e., the key S1 to the first timeslot T1, the keys S2 to the second timeslot T2, the key S3 to the third timeslot T3, the key S4 to the fourth timeslot T4, the key S5 to the fifth timeslot T5, the key S6 to the sixth timeslot T6, the keys S7 to the seventh timeslot T7, and the keys S8 to the eighth timeslot T8.

Thus, when answering the third request of the vehicle, there is no longer any danger of collision since only one key S1 to S8 is still allocated to each timeslot T1 to T8, and thus several keys S1 to S8 cannot answer within the same timeslot T1 to T8.

Thus, the vehicle is opened at the latest by the answer to the third request of the vehicle.

If a key S1 to S8 is registered in only one timeslot T1 to T8 in response to this request of the vehicle, the further opening process is continued by this key S1 to S8, and the vehicle is thus opened by this key S1 to S8.

If, in each case, one key S1 to S8 is registered in several timeslots T1 to T8 in response to this third request of the vehicle, then the further opening process is carried out by one of these keys S1 to S8, for example by the key S1 to S8 with the lowest value, and the vehicle is thus opened by this key S1 to S8.

A data collision occurs, in particular, by several radio participants simultaneously overlapping. Here, it can be detected by the vehicle whether this data collision is caused by two keys S1 to S512 answering in the same window of time T1 to T8 or by an external disruption source, since a respective answering time of the keys S1 to S512 is known. Thus, it is not incidental at which point in time the answer takes place. This does not relate to external disruption sources, for example. In addition, a duration of the answer of the keys S1 to S512 is known. Thus, it can be measured, for example, how long the data collision is present and whether this falls into a valid window of time.

If it is thus established that the data collision is caused by two keys S1 to S512 answering in the same window of time T1 to T8, the process sequence described above is carried out. However, if it is recognized that it is a different disruption, for example as a result of an external disruption source, the described process is advantageously not applied. For example, in such a case, the first request is transmitted again by the vehicle and a new answer is waited for, which is then possibly no longer disrupted by the external disruption source.

After the vehicle has been opened in the manner described, the initial distribution of the keys S1 to S512 to the timeslots T1 to T8 is advantageously reproduced, as shown in FIG. 1, i.e., their initial allocation to the timeslots T1 to T8, such that all keys S1 to S512 registered to the vehicle can be used again for a subsequent opening procedure, and the method can be carried out once again in the described manner.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for opening a vehicle, the method comprising:
   registering, to the vehicle, a plurality of keys for opening the vehicle;
   transmitting, by the vehicle, a first request; and
   determining, by the vehicle, whether one of the plurality of keys transmitted an answer to the first request,
   wherein one of the plurality of keys must transmit an answer to the first request to open the vehicle, and
   wherein a plurality of successive timeslots are allocated for transmitting the answer to the first request and more than one of the plurality of keys are allocated to a same one of the plurality of successive timeslots.

2. The method of claim 1, wherein when only one key of the plurality of keys answers the first request of the vehicle in at least one of the timeslots, the vehicle is opened by the only one key.

3. The method of claim 2, wherein when no more than one key of the plurality of keys answers the first request of the vehicle in each of the plurality of successive timeslots, the vehicle is opened by one of the plurality of keys that answers key the first request of the vehicle in each of the plurality of successive timeslots.

4. The method of claim 1, wherein when only one key of the plurality of keys answers the first request of the vehicle in none of the plurality of successive timeslots and several keys of the plurality of keys answer the first request of the vehicle in at least one of the plurality of successive timeslots, the method further comprises:
   performing a first key redistribution by transmitting, by the vehicle, a second request, wherein only the several keys of the plurality of keys are allocated a timeslot for transmitting an answer to the second request, and
   wherein one of the several keys of the plurality of keys must transmit an answer to the second request in order to open the vehicle.

5. The method of claim 4, wherein when only one of the several keys of the plurality of keys answers the second request of the vehicle in at least one of the timeslots, the vehicle is opened by the one of the several keys.

6. The method of claim 1, wherein when only one key of the plurality of keys answers the first request of the vehicle in none of the plurality of successive timeslots, a first at least two of the plurality of keys answer the first request of the vehicle in at least one of the plurality of successive timeslots, and at second at least two keys of the plurality of keys answer the first request of the vehicle in at least one additional one of the plurality of successive timeslots, the method comprises:
   performing first key distribution by transmitting, by the vehicle, a second request, wherein only the first at least two of the plurality of keys and the second at least two plurality of keys are allocated a timeslot for transmitting an answer to the second request, and
   wherein one of the first or second at least two of the plurality of keys must transmit an answer to the second request in a timeslot allocated to the first or second at least two of the plurality of keys in order to open the vehicle.

7. The method of claim 6, wherein when, in each case, only the one of the first and second at least two of the plurality of keys answers the second request of the vehicle in one of the allocated timeslots, the vehicle is opened by the one of the first and second at least two of the plurality of keys.

8. The method of claim 4, wherein when only one key of the plurality of keys answers the second request of the vehicle in none of the timeslots and further several keys of the several keys of the plurality of keys answer the second request of the vehicle in at least one of the timeslots allocated for transmitting an answer to the second request, the method further comprises:
   performing a second key redistribution by transmitting, by the vehicle, a third request, wherein only the further several keys are allocated a timeslot for transmitting an answer to the third request,
   wherein one of the further several keys must transmit the answer to the third request of the vehicle within the allocated timeslot in order to open the vehicle.

9. The method of claim 6, wherein when only one key of the plurality of keys answers the second request of the vehicle in none of the plurality of successive timeslots, a third at least two of the plurality of keys answer the second request of the vehicle in at least one of the plurality of successive timeslots, and at fourth at least two keys of the plurality of keys answer the second request of the vehicle in at least one additional one of the plurality of successive timeslots, the method further comprising:
   performing a second key redistribution by transmitting, by the vehicle, a third request, wherein only the third and fourth at least two keys of the plurality of keys are allocated a timeslot for transmitting an answer to the third request,
   wherein one of the third and fourth at least two keys of the plurality of keys must transmit answer the answer to the third request of the vehicle within the allocated timeslot in order to open the vehicle.

10. The method of claim 4, wherein key redistributions are repeated by the vehicle transmitting further requests, wherein in each repeated key redistribution a subset of the several keys are allocated a timeslot to transmit an answer to the further requests until only one of the subset of several keys transmits an answer to one of the further requests in at least the allocated timeslot of the further key redistributions.

* * * * *